United States Patent [19]

Fournier et al.

[11] 4,103,804
[45] Aug. 1, 1978

[54] CLAMP ACTION SEALING DEVICE FOR TAB OPENING CANS

[76] Inventors: Erick-Pierre Fournier; Ethel V. Hill, both of 30 Park Ave., New York, N.Y. 10016

[21] Appl. No.: 620,180

[22] Filed: Oct. 6, 1975

[51] Int. Cl.² ............................................. B65D 39/16
[52] U.S. Cl. .................................... 220/281; 220/259; 220/307; 220/335; 220/DIG. 19
[58] Field of Search ............... 220/307, 252, 259, 335, 220/339, 90.6, DIG. 19, 254, 256, 257, 258, 281, 282, 283

[56] References Cited

U.S. PATENT DOCUMENTS

| | | | |
|---|---|---|---|
| 3,021,976 | 2/1962 | Tracy | 220/307 |
| 3,197,089 | 7/1965 | Michael | 220/90.6 |
| 3,246,792 | 4/1966 | Brackmann et al. | 220/335 |
| 3,428,212 | 2/1969 | Rohrlick | 220/307 |
| 3,458,080 | 7/1969 | Laurizio | 220/259 |
| 3,622,034 | 11/1971 | Lutzker et al. | 220/307 |
| 3,664,541 | 5/1972 | Ruskin | 220/307 |
| 3,682,349 | 8/1972 | Cospen et al. | 220/231 |
| 3,847,300 | 11/1974 | Waters | 220/307 |
| 3,871,550 | 3/1975 | Chiappe | 220/339 |

*Primary Examiner*—William Price
*Assistant Examiner*—Joseph M. Moy
*Attorney, Agent, or Firm*—Morgan, Finnegan, Pine, Foley & Lee

[57] ABSTRACT

Closures having a generally triangular shape corresponding to tab opening cans include a seal plug with depending sealing lips and an internal cavity which facilitates installation and provides a sealing force. A resilient spring member may also be imbedded in the closure about the cavity to increase the sealing. The closures are resealable and may be reusable. A pouring or drinking spout and protective lip structure is also disclosed. The closures are opened by means of handles which define the cavity. The handles may include a structure for locking the handle on the rim of the can during dispensing. The closures are suited for use on a wide variety of can aperture sizes.

7 Claims, 32 Drawing Figures

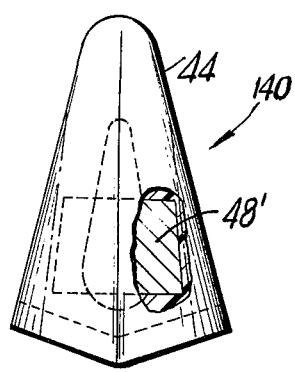
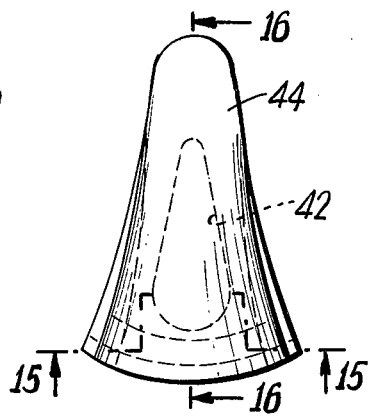
FIG.10    FIG.14
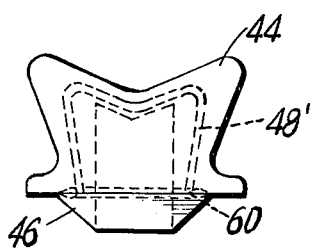
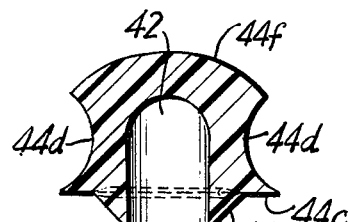
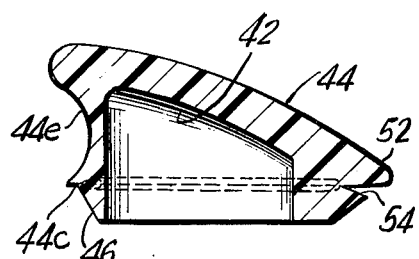
FIG.11    FIG.15    FIG.16
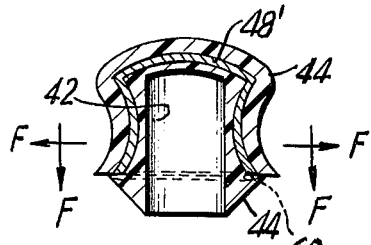
FIG.12
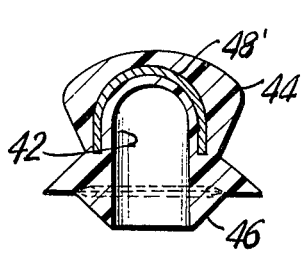
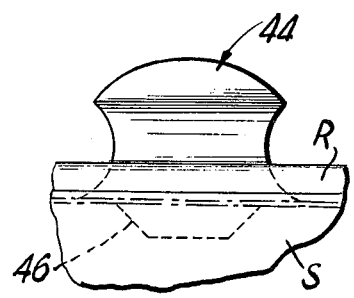
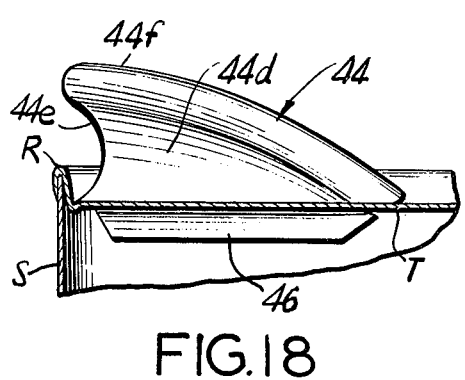
FIG.13    FIG.17    FIG.18

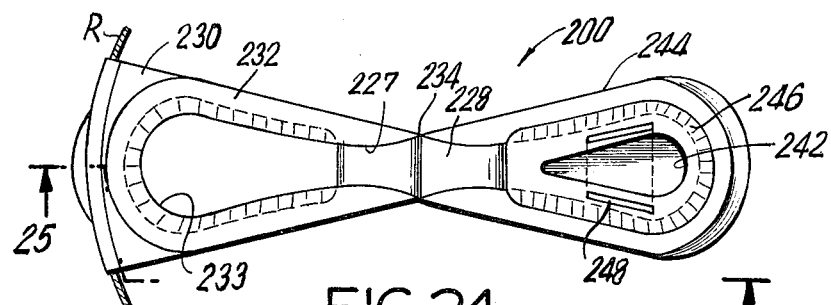
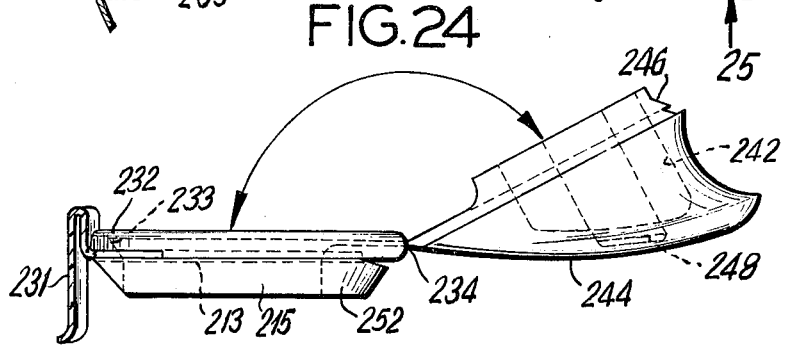
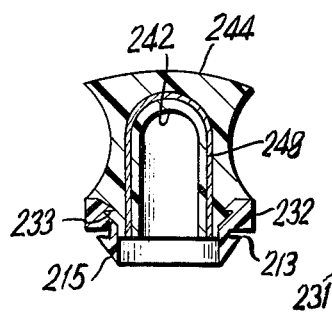
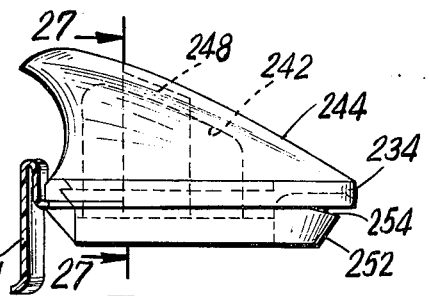
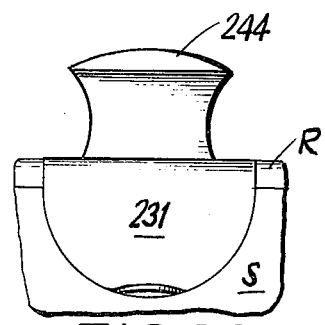
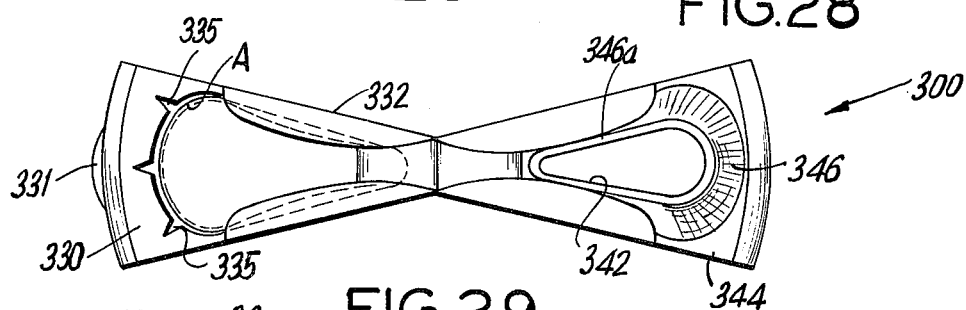
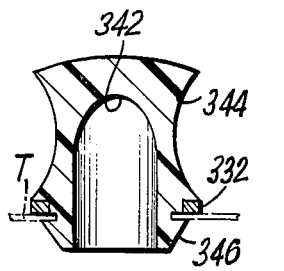
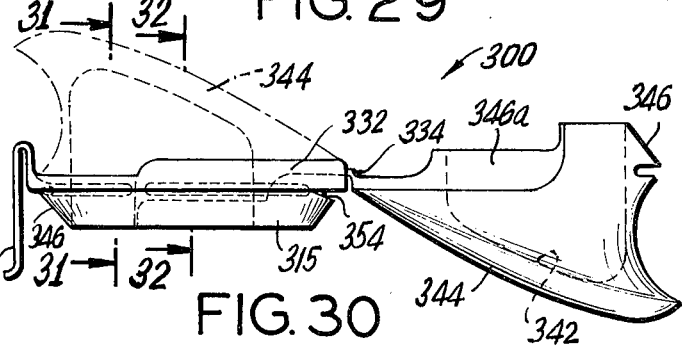
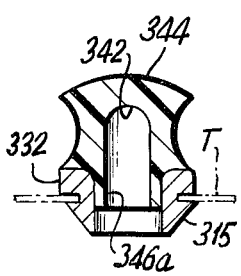

CLAMP ACTION SEALING DEVICE FOR TAB OPENING CANS

BACKGROUND OF INVENTION AND PRIOR ART

Over the past decade, the convenience of so-called "flip-top" cans equipped with a pull-type tab opening has enjoyed increasing popularity and has made them an established part of people's daily life in many countries. However, due to their inability of being resealable, flip-top cans have created a form of forced consumption by generating a substantial amount of unwanted waste. Once such a pull tab can is opened, its contents must be consumed within a relatively short period of time. Otherwise, the carbon dioxide in the case of carbonated beverage will escape and the beverage will consequently go "flat," thus becoming untasty and for all practical purposes unconsumable.

A similar situation applies to non-carbonated beverages, such as fruit juices. Unless the partially consumed contents of the can are properly sealed, the flavor and vitamin content escape as well in fairly short order.

There is an additional problem associated with flip-top cans which particularly affects children. As the metal tab is ripped off from the can top, it occasionally leaves some sharp burrs around the periphery of the opening. These burrs have been known to cause cuts and bleeding when the child's tongue is inserted into the pouring aperture of the can whether done inadvertently or in a playful way as the case usually is among youngsters.

While the prior art does not show to date any particular embodiment combining a spout an plug assembly allowing children to drink out of a flip-top can in total safety while preventing the carbon dioxide from escaping whenever desired, several reusable sealing arrangements for tab opening cans have been developed. Worthwhile as they are, seals of the kind currently available on the market fall short of the ideal embodiment for various reasons.

Several closures in the prior art, see U.S. Pat. Nos. 3,428,212; 3,622,034; 3,650,432 and Re. 27,301, are designed to fit only one specific type of opening geometry. Additionally, there is no provision for retaining the closures on the can so that reclosure is inconvenient for the consumer.

Other container closures and combination closure-dispensers not directly related to tab opening cans are disclosed in U.S. Pat. Nos. 2,986,309; 3,018,024; 3,021,976; 3,081,005; and 3,187,964.

The greatest difficulty involved in developing an effective sealing device for flip-top opening cans lies in the wide variety of their shape openings in terms of both dimensions and configuration.

Measurements of the opening geometry of all commercially available flip-top cans show that their lengths vary from 27 to 30 millimeters, their widths at mid-length vary by plus or minus 1 millimeter, whereas their maximum width at the base of the aperture ranges from 13 to 17 millimeters.

Consequently, to be effective, the sealing device must be sufficiently flexible and designed in such a way that it can conveniently contract lengthwise and especially widthwise while providing a tight and even peripheral seal regardless of the configuration of the opening and permitting at the same time ease of insertion and removal.

SUMMARY OF THE INVENTION

The present invention relates to resealable, reusable closures for tab opening cans. More particularly, the present invention is directed to improvements on the closure described in our contemporaneously filed, co-pending application Ser. No. 620,124, incorporated herein by reference.

Basically, the present invention relates to an improved closure device of unitary construction which comprises a seal plug having a deep internal cavity which allows the device to be easily squeezed for insertion and removal from the can aperture, and the addition of a generally U-shaped metal spring insert in the seal plug surrounding the cavity. The metal insert provides additional lateral forces on the walls of the seal plug to provide increased sealing forces.

Several modifications are disclosed including a protective spout and lip to protect the consumer from burrs on the edges of the can opening. The sealing plug also includes a tab which interlocks with the can rim to retain the plug in the opened portion. All of the embodiments include the concept of clamp action manual manipulation for insertion and sealing.

Thus, while the closure of the present invention provides not only a tight seal, it is convenient to manipulate, to insert and to remove from the opening. The closure fits a vast majority of tab opening cans on commercial use so that a single closure geometry is available for decreased cost of production and purchase by the consumer.

These and other features will become readily apparent from the description to follow and the drawings wherein corresponding function elements are correspondingly numbered with the addition of a hundred or multiples of a hundred to their basic numerical designation.

BRIEF DESCRIPTION OF THE DRAWINGS

FIG. 10 is a top plan view, with certain portions broken away, illustrating a closure device of the present invention with a vertically disposed metal insert;

FIG. 11 is a front elevation view of the closure in FIG. 10;

FIGS. 12 and 13 are lateral cross-sectional views illustrating alternative closure and spring insert configurations;

FIGS. 14, 17 and 18 are top, front and side views of a closure device wherein the sides are thickened to promote spring action;

FIGS. 15 and 16 are cross-sectional views taken along lines 15—15 and 16—16, respectively, in FIG. 14;

FIGS. 24 and 25 are top plane and side views, respectively, of a fixed ring geometry closure device in the dispensing position;

FIG. 26 is a side elevation view of the fixed ring geometry closure device in the closed position;

FIG. 27 is a cross-sectional view taken along line 27—27 in FIG. 26;

FIG. 28 is a front elevation view of the closure in FIG. 26;

FIG. 29 is a top plane view of a closure device of the variable ring geometry type in the open position;

FIG. 30 is a side elevation view of the device in FIG. 29 also showing the device in closed position in phantom line; and FIGS. 31 and 32 are cross-sectional views taken along lines 31—31 and 32—32, respectively, in FIG. 30 of the closure in the closed position.

DETAILED DESCRIPTION OF A PREFERRED EMBODIMENT

Figure 1:
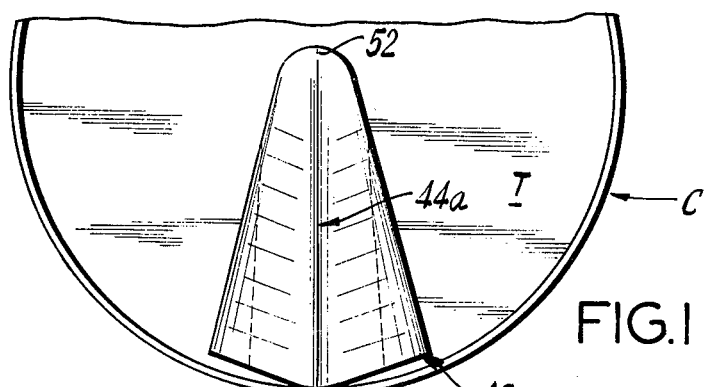
FIGS. 1, 2, 3 and 4 are top, front, side and bottom views, respectively, of a clamp action closure device of the present invention.

While this invention is susceptible of embodiment in many different forms, there is shown in the drawings and will hereinafter be described in detail a preferred embodiment of the invention, and modifications thereto, with the understanding that the present disclosure is to be considered as an exemplification of the principles of the invention and is not intened to limit the invention to the embodiments illustrated.

Figures 2, 3:
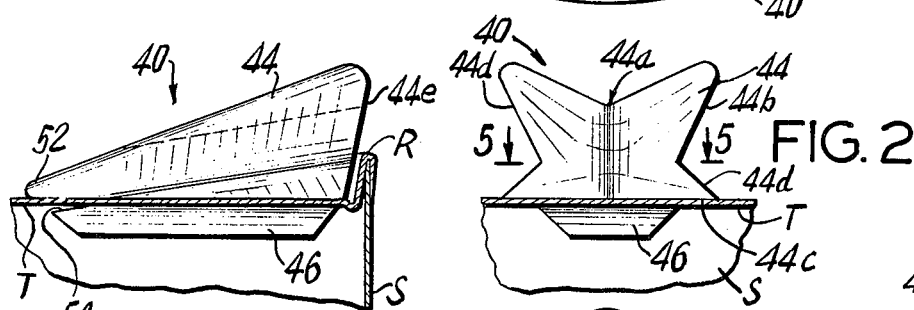

FIGS. 1–18 illustrate a first closure device 40 which includes three components forming an integral assembly of rubbery and relatively flexible material. Closure 40 is adapted to seal an aperture in the top end wall of a flip-top or pop open can. As best illustrated in FIGS. 1 and 3, can C includes a top end wall T which is connected to the circular sidewall S by a bead rim R in the conventional manner. Formed in top wall T is a removable section (not shown) having a key ring or tab attached thereto (not shown) to facilitate removal of the section. When the section is removed an opening or aperture having a generally triangular or tear-drop shape is formed in the top wall T through which the contents of the can may be dispensed.

Structurally, closure 40 comprises three elements: a deep central cavity 42, an outer shell or handle 44 which defines the central cavity and includes depending sealing lips 46 and a U-shaped metal insert 48 embedded in handle 44 and bridging cavity 42.

Closure 40 is generally triangular in shape as viewed from the top, FIG. 1, and triangular or wedge-shaped when viewed from the side, FIG. 3.

Figure 4:
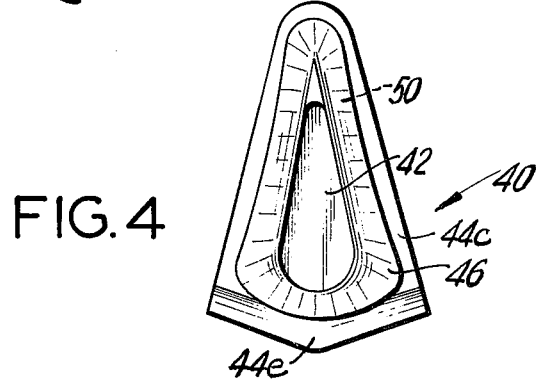
Figure 6:
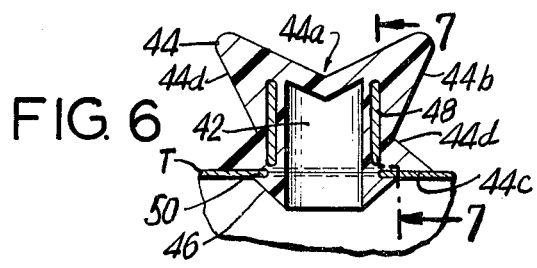
FIG. 6 is a cross-sectional view taken along line 6—6 in FIG. 5.
Figure 7:
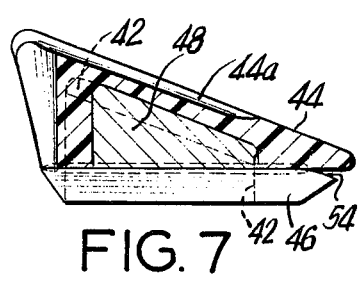
FIG. 7 is a cross-sectional view taken generally along line 7—7 in FIG. 6.

The volumetric shape of the central cavity 42 replicates the overall shape of the sealing device and is designed to fit into the can opening: generally triangular in shape in horizontal cross-section, FIG. 4, it extends vertically from the base of the sealing lips 46 upwards to a level below the upper surfaces of the handle, FIG. 6, thereby permitting the handle to be manually flexed or folded inwardly along an inner recess 44a for convenient insertion and removal of the closure.

The central cavity 42 is surrounded by handle 44. Internally, handle 44 comprises a peripheral wall 44b extending at its base into a tapered, wedge-shaped sealing lip 46 designed to engage with the rim of the can opening by means of peripheral groove 50 as shown in FIGS. 2 and 4. Externally, the wedge-shaped handle comprises at its base an upper peripheral flange 44c extending substantially beyond the geometry of the can opening and designed to seal the opening in cooperation with the lower sealing lip 46. Handle 44 also includes lateral triangular recesses 44d and a tapered front 44e to allow for convenient manual gripping of the device while, as mentioned earlier, the longitudinal top recess 44a permits the structure to contract and to fold inwardly. As long as these digital recesses are concave they can assume a variety of design variances as represented in FIGS. 11, 12, 13 and 15. The end of the closure opposite rim R terminates into an elongated tip 52 designed to engage and to lock into the narrow end recess of the can opening in cooperation with sloping groove portion 54 formed by sealing lip 46.

Figure 8:
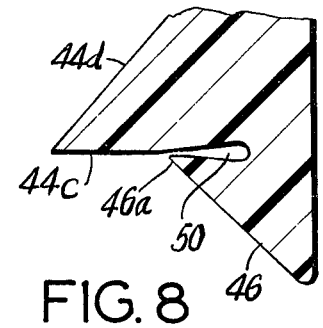
FIGS. 8 and 9 are enlarged, fragmentary cross-sectional views illustrating alternative sealing lip and groove configurations for the closure devices of the invention.
Figure 9:
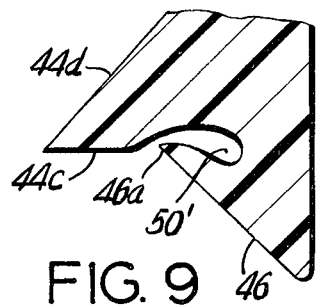

As shown in FIGS. 8 and 9, the cross-sectional shape of the groove 50 should desirably assume a trough-like recess shape to allow the tip 46a of sealing lip 46 to act as a suction cup over the bottom surface of the can top and to improve the sealability of the assembly. As illustrated, groove 50, FIG. 8, is defined by linear walls terminating in a bulbous end, and groove 50', FIG. 9, is defined by non-linear walls terminating in a bulbous end to form a teardrop shape.

The metal insert 48 around which the sealing device is injection molded is designed to act as a spring and to exert lateral forces on the walls of the closure in order to magnify the inherent resilient characteristics of the material composition and to achieve thereby a tighter seal against the rim of the can opening. Conversely, the insert also contributes to the ease of removal of the device when pinched inward.

Figure 5:
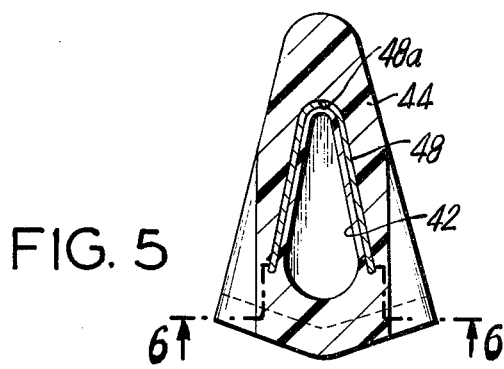
FIG. 5 is a cross-sectional view taken along line 5—5 in FIG. 2 illustrating the horizontal metal insert.

To these ends, the metal insert can assume two basic shapes: As shown in FIG. 5, it can be designed in the form of a horizontal U-shaped structure surrounding the internal cavity 42 with its fulcrum point 48a situated at the apex of the triangular-shaped cavity 42. Alternatively, as shown in FIG. 10, the insert 48' can assume a vertical, inverted U-shape with the fulcrum positioned over the internal cavity 42. A number of possible insert design variances are shown in FIGS. 11, 12, 13 and 26. For example, by having the free end tips 60 of the inserts 48' extend downwardly to the elevation of the upper surface of can top T and by designing the insert with sufficient vertical flexibility (as for a shock-absorber), a resulting dual force system F—F can be achieved as shown in FIG. 12. In such embodiments, the insert 48' is capable of exerting both lateral forces against the edge of the can opening as well as vertical forces against the top of the can thereby forcing the sealing lip 46 to adhere more strongly to the interior surface of the can top. The insert can still be fabricated in other ways: a semi-circular arch, FIG. 13; or an elongated arch, FIG. 27, whose legs reach below the level of the can top for added lateral sealing force against the edge of the can opening.

By modifying the internal structure of the handle to take advantage of the inherent resiliency of the rubbery material composition of the closure, a desirable spring effect can be achieved without resorting to the assistance of a metal insert. As shown in FIGS. 15 and 16, by thickening the lateral walls 44d as well as the top 44f of the handle and by thinning down its front wall 44e to reduce resistance to insertion and removal, a collapsible horseshoe-like cross-sectional handle is formed to provide a built-in spring effect with the capability of exerting lateral forces.

Such built-in spring effect is also designed to greatly facilitate the manipulation of the sealing closure. For insertion, the tip 52 of the device is placed at mid-length over the opening of the can and subsequently pushed radially downwardly toward the end recess of the can aperture in order to tightly engage the can top between the sloping end groove 54 and the upper flap of the device. Once the tip of the closure has been placed in such position, the device is gripped by the side recesses 44d and pinched to contract the walls of the handle and sealing lips into the central cavity 42. With the walls and the sealing lips 46 pressed against each other and thus offering a minimum of resistance, the device can be easily pressed into the can opening down to the level at which the flange 44c abuts the can top T. After the sealing lips 46 are engaged with the edges of the can aperture, manual pressure on the sides of the handle 44 is released to let the walls expand and seal the opening. The removal of the device follows a reverse procedure: first, the device is pinched to disengage the lateral sealing lips 46 from the can aperture, then lifted upward to disengage the frontal sealing lips 46 from the forward portion of the can opening. The device is then slid backward from the end-recess of the opening toward the rim of the can to disengage the groove 54 of the closure. Once tip 52 has reached the mid-length of the can aperture, the whole assembly can be lifted free and removed from the can top.

A further sealing device is shown in FIGS. 19 to 23, which are based on the same concept as the devices disclosed in our above-identified application except for the structural differences of the handle element which have been just described to achieve the clamp action features.

Figure 20:
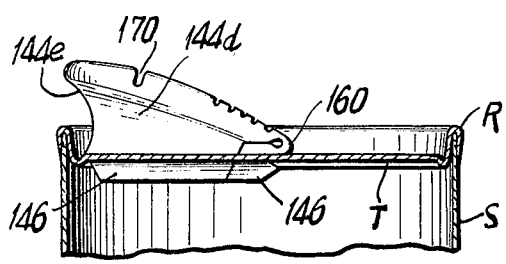
FIGS. 20 and 21 are side views of the closure in FIG. 19 in the sealing and dispensing positions, respectively.
Figure 22:
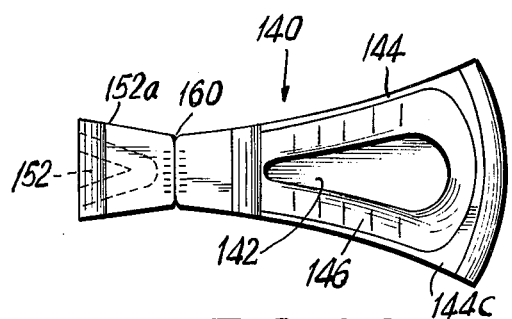
FIGS. 22 and 23 are bottom and side views of the closure in FIG. 19 in the open position.
Figure 23:
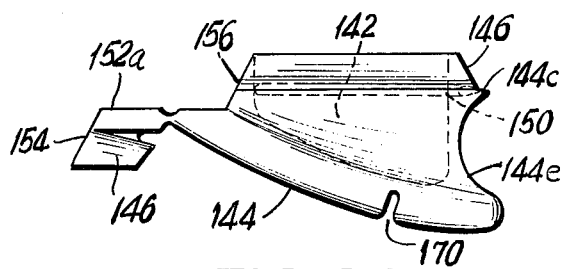

Referring more specifically to FIGS. 22 and 23, closure 140 incorporates two components consisting of a sealing plug handle 144 connected at its distal end to an anchoring tip 152 via "living hinge" 160 and forming one integral assembly. Anchoring tip 152 consists of a flat lid cover 152a surmounting a wedgeshaped, lower section comprising a generally triangular sealing lip 146 surrounding an open cavity 152, which allows the lip to contract and to be locked into position according to the different geometries of the can opening A. The maximum internal length of the anchoring tip does not need to block off more than 7 millimeters of the total length of the can aperture and, as such, does not interfere with proper pouring while providing sufficient support to permit the handle plug 144 to be conveniently maneuvered back and forth about hinge 160. To this end, the proximal edge 154 of the anchoring tip is tapered backward and matches in dimensions and angularity a replicate forward tapered edge 156 at the rear section of handle plug 144. This arrangement permits the plug to be conveniently folded into the pouring aperture of the can and develop a proper seal and abut with the upper surface of the anchoring tip 152, as shown in FIG. 20.

Figure 19:
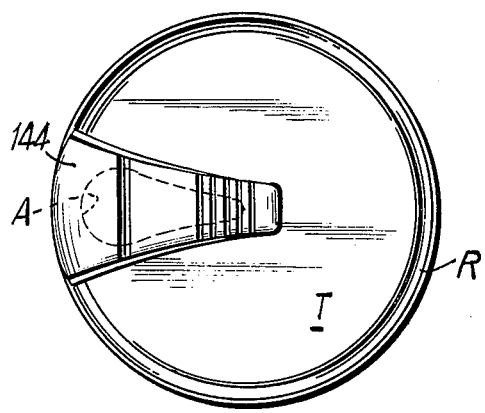
FIG. 19 is a top plane view of a further closure embodiment with anchor tip installed in a tab opening can aperture.

While the upper structure of handle plug 144 conforms to the generally triangular shape of the flip-top can aperture A, FIG. 19, its flange 144c extends substantially beyond the dimensions of the opening in order to generate, in cooperation with sealing lip 146 and groove 150, a tight seal. As described above in connection with closure 40, the bottom structure of the handle plug 140 comprises a sealing arrangement consisting of a peripheral, tapered sealing lip 146 defining a groove 150 capable of conforming to the generally triangular shaped openings of "flip-top" cans. The groove 150 may be of the types shown and described in connection with FIGS. 8 and 9. The sealing lip surrounds a deep cavity 142 which extends from the base of the closure upwardly to the level of the top of the closure and allows the lip 146 and handle plug 144 to be flexed and conform to the exact contour of the aperture to be sealed.

Figure 21:
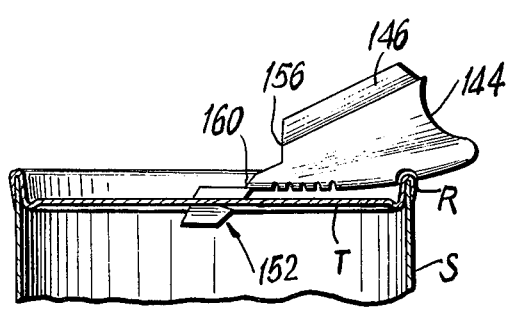

Gripping handle 144 incorporates frontal and longitudinal scooped out recess 144c and 144d to allow convenient digital manipulation, and includes a lateral cavity 170 along its upper surface. Cavity 170 is designed to engage the rim R of the can when the handle is flipped over 180° and to stay locked in the opened position as illustrated in FIG. 21. Secured in this fashion, plug element 132 does not interfere with drinking while it provides the convenience of a closure which can be quickly put back in its sealing position by the mere flicking motion of a finger.

A third embodiment of sealing device is shown in FIGS. 24 to 32, which incorporates a safety drinking spout designed to eliminate injury to tongue or lips.

Such safety spouts are of two types: spouts designed with a so-called fixed ring geometry, and therefore restricted to can openings of closely related dimensions, particularly in the forward section of the can aperture, FIGS. 24–28; and spouts designed with a so-called variable ring geometry and consequently adaptable to substantially all can sizes and configurations of can openings, FIGS. 29–32.

Referring more specifically to FIGS. 24 and 25, the closure device 200 of the fixed ring geometry type comprises two main sections made up of rubbery, plastic composition and forming one unitary assembly of generally triangular shape: a peripheral, flat-topped, spout-like ring 232, adapted to surround the edge of the underlying can opening, and connected at its distal end to a foldable handle plug 244 by a "living hinge" 234. As shown in FIG. 25, the safety ring proper of the closure consists of a 2 to 5 millimeter high drop-shaped crown arranged to cover the entire periphery of the can aperture A and incorporating two superposed sets of tapered sealing lips 215 and 233.

Sealing lip 233 is designed to engage the inverted wedge-shaped sealing element 246 of the handle to plug the can opening, and sealing lip 215 is arranged to engage the edge of can top T and lock around it by means of groove 213. When the handle is folded into the sealing position, it rests against the top of ring 232.

Due to the interaction of material composition and structural design, both sealing lips 215 and 246 are provided with enough flexibility and resiliency to allow inward and outward flexing of the sealing arrangements, thereby developing the tight frictional fit required for an adequate seal.

Integrated to the forward section of the closure is an apron 230 which covers the innerspace between the safety ring 232 and the rim R of the can. Apron 230 extends over the seam and down over the side of the can in the form of a semi-circular safety lip 231, as shown in FIG. 28. Thus, closure 200 affords complete protection to the consumer's lips when he drinks from the can.

Toward its distal end, the safety ring 232 is provided with an anchoring tip 252 designed to be locked into the narrow end recess of the can opening. Directly superposed over said anchoring tip, provisions are made for a flat recess 227 to allow a reciprocal recess 228 in the handle plug to fold flat over it during closure and to insert itself between the tapered edges of the safety spout 32.

Handle plug 244 is connected to and extends from the distal end of the anchoring tip 252; it comprises a peripheral sealing lip 246 in the form of an elongated drop-shaped ring whose geometry is a mirror image of safety ring 232 but whose narrower dimensions allow the tapered edges to interlock with groove 233 of the spout ring structure.

Such interlocking action is made possible by the internal cavity 242 of the plug which, in cooperation with the flexible but resilient rubbery composition of the device, allows the internal walls of the plug to collapse inward, while the relatively thin and pliable walls of the safety ring 232 can in turn expand as can be visualized from FIG. 27.

As shown in FIGS. 24, 25 and 26, the handle plug 244 also incorporates a spring insert 248 whose legs reach well inside the safety spout so that the lateral forces built into the walls of the plug can be made to bear against the inner walls of safety spout 232, thereby contributing to tighter seal and greater safety against accidental opening of the closure.

As an alternative embodiment to the foregoing fixed ring geometry type of closure, a closure 300 is illustrated in FIGS. 29–32 which is adaptable to any size can opening configuration whose maximum dimensions fit within the current range of commercially used can apertures, namely 13 to 17 millimeters in width and 27 to 30 millimeters in length.

To that end, the sealing device 300 incorporates three key modifications:

First, because the greatest variation in can opening dimensions and configurations occur at the front end of the apertures (adjacent the rim), the forward sealing elements have been changed from the relatively non-expandable safety spout 246 to a flexible, expandable sealing lip 346 which engages the forward section of the can aperture from the bottom surface of the can top 32 and is thus able to seal the widest can apertures.

Second, the peripheral crown element 232 has been replaced by a partial crown 332 which locks around the edge of the can opening but covers only the narrower upper two-thirds of the can aperture which is responsible for virtually all tongue injuries.

Third, the ring 332 and handle plug 344 form mirror image interlocking counterparts. Sealing lip 346 engages the forward one-third of the can aperture, see FIG. 31; and an annular wall portion 346a depends from lip 346 to be sealingly received with the rearward two-thirds of ring 332, see FIG. 32. Wall portion 346a surrounds clamp action cavity 342.

In order that the apron 330 be adaptable to different opening widths and to prevent it from buckling, small indentations 335 have been provided on its surface at its junction with the front end of the can opening to allow for expansion and contraction according to width and configuration of the apertures.

The procedure for placing the closures 140, 200 and 300 in position is basically the same as the one outlined earlier for closure 40. Taking advantage of the flexibility of the assembly, the anchoring tips 152, 252 and 352 are first placed flat at the mid-section of the can opening A. By exerting a slight downward pressure followed by a forward push, the sloping end grooves 154, 254 and 354 of the anchoring tip engage the can opening. The closure is then thrust forward to lock the anchoring tip into the narrow end recess of the aperture. Once in position, the apron lip is pulled downwardly over rim R.

The removal of the closure can be simply and quickly effected by observing the following three steps in sequence: with the plug in the open position, the apron lip is lifted up to disengage the sealing lip from the outer section of the can opening. The closure is then pushed and/or pulled radially outwardly to disengage the anchoring tip from its recess; once fully disengaged, the closure can be lifted up and removed completely from the aperture.

For optimum performance, it is essential that these various types of sealing devices exhibit characteristics of flexibility, resiliency and superior flex life; in addition, the material composition should also be chemically inert, non-toxic to the contents of the can and, most importantly, suitable for injection molding and quickly curable.

To satisfy these criteria, any number of thermoplastic elastomeric polymers, copolymers or terpolymers such as Neoprene, Thiokol, Butadiene or the like would be the most desirable. However, a number of low-density plastic resins such as fluorocarbons, polyethylene, polypropylene, urethane or vinyl could also be acceptable as substitute materials.

These and other modifications may be made to the present invention by those skilled in the art without departing from the scope and spirit of this invention as pointed out in the appended claims.

What is claimed is:

1. A reusable, flexible resilient closure for sealing a can top aperture having a generally triangular shape which comprises: a manually grippable handle portion having a flange at its lower portion, said flange having a shape generally corresponding to but larger in dimension than said can aperture, sealing means depending from said flange and arranged to cooperate with said flange to form a seal with part of said can top aperture; and the handle defining a deep internal cavity open to the bottom of the closure such that said closure may be flexed laterally when manual pressure is applied thereto to facilitate insertion and removal of the closure and to apply lateral sealing force when the closure is inserted in the aperture; an anchor portion hinged to one end of said handle and nestable therebeneath and having a depending sealing lip, which defines a groove with the anchor portion, said sealing lip and groove being arranged to cooperate with said sealing means to complete the seal between said closure and said aperture, said groove being tapered from the free end of the anchor portion to provide a can top entrance, whereby the anchor portion may be slid into and engage the edges of said can aperture and retaining said closure on the can top during use.

2. The closure of claim 1, wherein said sealing means includes a depending sealing lip cooperating with said flange to form a groove, wherein the edge of said can aperture is received.

3. The closure of claim 1, wherein said handle portion is generally wedge-shaped in longitudinal cross-section.

4. The closure of claim 1, wherein said handle portion includes a cavity in its surface for locking the handle to the rim of the can whereby said plug portion may be locked in an open position on the rim of the can.

5. A unitary closure for use with a tab opening can to seal the generally triangular shaped can aperture, which comprises:

(a) a handle plug portion having an outline generally conforming to but larger than said can aperture;

(b) an anchor portion hinged to one end of said plug portion and arranged to nest beneath the underside thereof;

(c) sealing lip structure depending from said plug and anchor portions and defining a sealing groove therewith; the groove defined by said anchor portion tapering inwardly from said one end; and (d) said handle plug portion defining a deep internal cavity, whereby said handle plug portion may be manually squeezed for insertion of the sealing lip structure; said handle portion defining a groove for resiliently engaging the rim of said can to lock the closure in an open position.

6. The closure of claim 5, wherein said handle portion is generally wedge-shaped.

7. The closure of claim 5, wherein said closure is sealingly fittable within a variety of can aperture sizes.

* * * * *